(12) United States Patent
Shakir et al.

(10) Patent No.: US 7,939,006 B2
(45) Date of Patent: May 10, 2011

(54) METHOD OF MAKING MOLDED ARTICLES

(75) Inventors: Saleem Shakir, Westlake, OH (US); Sang Lee, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 12/593,232

(22) PCT Filed: Mar. 29, 2007

(86) PCT No.: PCT/US2007/065503
§ 371 (c)(1), (2), (4) Date: Sep. 25, 2009

(87) PCT Pub. No.: WO2008/121140
PCT Pub. Date: Oct. 9, 2008

(65) Prior Publication Data
US 2010/0112288 A1 May 6, 2010

(51) Int. Cl.
*C08L 27/00* (2006.01)
(52) U.S. Cl. ............. 264/328.1; 264/331.15; 428/35.7
(58) Field of Classification Search ........... 264/328.1, 264/331.15; 428/35.7
See application file for complete search history.

(56) References Cited

U.S. PATENT DOCUMENTS
5,295,339 A * 3/1994 Manner .................. 52/518

OTHER PUBLICATIONS

Geon HTX 66311 Natural, Polyone Technical Data Sheet, version issued Apr. 6, 2001, 2 pages.*
Geon M3850, Polyone Technical Data Sheet, version issued May 1, 2001, 2 pages.*
Geon Rigid Vinyl Molding Compounds Processing Guide, Technical Service Report No. 71, PolyOne Corporation, 1998, pp. 1-6.*

* cited by examiner

*Primary Examiner* — Jill L Heitbrink
(74) *Attorney, Agent, or Firm* — John H. Hornickel

(57) ABSTRACT

A method of making a finely textured molded article is disclosed. The method utilizes properties of the compound being molded, such as impact toughness and melt flow index. Poly (vinyl halide), particularly poly(vinyl chloride), articles can be compound-injection-molded using the method, in order to simulate the appearance of original metal, glass, or wood articles. Consumer, transportation, building construction, and other industries can benefit from durable plastic articles that simulate the more fragile articles.

20 Claims, 1 Drawing Sheet

METHOD OF MAKING MOLDED ARTICLES

FIELD OF THE INVENTION

This invention relates to a method of making molded articles from high flow custom-injection-molded poly(vinyl halide) compounds.

BACKGROUND OF THE INVENTION

Thermoplastic materials have transformed consumer and industrial products, replacing metal, glass, and wood, because such thermoplastic materials do not rust, shatter, or rot, respectively.

Poly(vinyl halide), especially poly(vinyl chloride), has become a common building material for siding, windows, decking, etc. The goal of using poly(vinyl halide) products to create the appearance of the use of original materials.

Simulated appearance by plastic of a metal, glass, or wood item greatly depends on how it is made. As between extrusion and molding, for example, extrusion is a continuous operation through a die that configures the profile dimensions of the thermoplastic item but has no practical ability to provide simulated appearance on the surfaces of the item not on the edges of the profile.

It is possible to "stamp" a simulated appearance on such surfaces, but the simulation precision suffers from that batch-wise effort to make an extruded product appear molded.

Molded articles, therefore, have a much better chance of serving to simulate the metal, glass, or wood article the thermoplastic molded article is designed to replace. However, those skilled in the art of injection molding, for example, know how difficult it is to reconcile the rheology of the thermoplastic being molded with the processing parameters of the molding equipment.

SUMMARY OF THE INVENTION

What the art needs is a method to injection mold poly(vinyl halide) compounds in a manner that permits finely textured molded poly(vinyl halide) articles to be made rapidly, repeatedly, and precisely.

The present invention solves that long-felt need in the art by a method which establishes rheological properties of the poly(vinyl halide) compound with processing parameters of the molding and processing equipment, to permit a thermoplastic article to be made rapidly and accurately. Preferably, a finely textured thermoplastic article can be made.

"Finely textured" in this invention means that surfaces of a molded article have such topography as to be capable of essentially simulating an original metal, glass, or wood article at a distance of about 1.5 meters or more.

One aspect of the present invention is a method of making a custom-injection-molded article, comprising the steps of (a) selecting a high flow custom-injection-molded polyvinyl halide compound having a Notched Izod Impact strength according to ASTM D256 at 23° C. and 0.32 cm thick test samples of at least about 640 J/m and a melt flow index according to ASTM D1238 of at least about 80 grams/10 minutes; and (b) injecting the compound into a mold cavity having a temperature ranging from about 180 to about 220° C. and (c) cooling the compound in the form of the compound-injection molded article.

Another aspect of the present invention is an article made from a custom-injection-molded ("CIM") compound using the method of the invention.

"Custom-injection-molded" in poly(vinyl halide) technology refers to those grades of poly(vinyl halide) compounds, especially poly(vinyl chloride) compounds, which are able to be injection molded into intricate shapes, preferably also having finely textured surfaces.

Advantages of the invention will become apparent from description of the embodiments and examples.

EMBODIMENTS OF THE INVENTION

Polyvinyl Halide Compound

Figure 1:
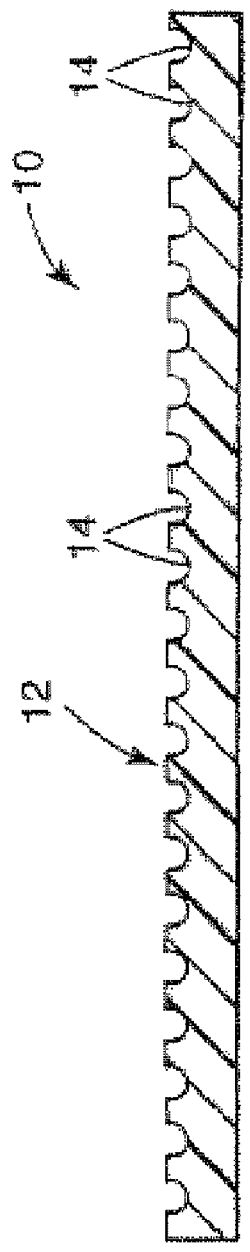
FIG. 1 is a cross-sectional view of a mold surface.

Any conventional CIM compound can be used if it has a melt flow index according to ASTM 1238 of at least 80 grams/10 minutes when measured using a load of 21.6 kg and at a temperature of 190° C. Non-limiting examples of CIM compounds include those made by PolyOne Corporation, Georgia Gulf Corporation, and other companies in the industry of making polyvinyl halide compositions for custom-injection-molded articles.

Custom-injection-molded polyvinyl halide compounds typically contain a polyvinyl chloride resin (usually suspension grade) alone or with other resins, tin-based, magnesium-based, and/or phosphite stabilizers; calcium carbonate fillers; stearate lubricants; acrylic or core-shell. MBS impact modifiers, or a combination of them; colorants; and processing aids.

Preferably, to achieve a melt flow index according to ASTM 1238 of at least 80 grams/10 minutes at 190° C. and a load of 21.6 kg, a minor amount of an alkyl-aryl phosphite color and processing stabilizer is added to the conventional custom-injection-molded polyvinyl halide compound, in which the polyvinyl halide has an inherent viscosity of about 0.52 (K value of about 49-51), in order to make it a high flow CIM compound useful in the present invention. As little as 2 phr of alkyl-aryl phosphite stabilizer (parts per hundred parts of poly(vinyl halide)) can be used to accomplish this conversion of the conventional CIM compound to the high flow CIM compound.

Without undue experimentation, one skilled in the art can review the Technical Data Sheets of commercially available compounds from such suppliers to ascertain whether the melt flow index exceeds 80 grams/10 minutes. Preferably, a CIM compound useful in the method of the present invention is GEON M7100 grade polyvinyl compound commercially available from PolyOne Corporation. This GEON M7100 grade compound has polyvinyl halide having an inherent viscosity of about 0.52 and also contains a minor amount of alkyl-aryl phosphite stabilizer, namely between 0.5 and 2.0 parts of ethylhexyl diphenyl phosphite.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Molding

The method of the present invention relies on a balance of physical and rheological properties of the custom-injection-molded polyvinyl halide) compound and the processing parameters of the molding equipment necessary to inject the compound into an intricate mold cavity.

Those skilled in the art have many known resources for understanding without undue experimentation the conditions needed to mold CIM compound. Generally, any conditions suitable for conventional CIM compound are also suitable for the high flow CIM compound useful in the present invention.

Non-limiting examples of published resources for CIM compound molding techniques include Technical Service Report No. 51, "Injection Molding Compound Processing Guide" from PolyOne Corporation (1996) and Technical Service Report No. 71, "PolyOne Geon® Rigid Vinyl Molding Compounds Processing Guide" from PolyOne Corporation (2007), both being available at www.polyone.com.

It is known from the latter report that presses designed to run engineering thermoplastic materials are usually well suited for running CIM polyvinyl halide compounds. Ideally the barrel is bimetallic. The compression ratio of the screw is in the range of 2:0:1 to 2:6:1. A free-flow sliding check ring is recommended. Smeartips and ball check valves are not recommended. A nozzle length in the 1-inch to 8-inch range is suggested. Longer nozzle lengths may lead to shear burning. The minimum recommended exit diameter of the nozzle is ¼ inch (6- to 8-oz. shot). As the shot size is increased, the nozzle exit diameter also needs to be increased. Full-taper or reverse-taper nozzles are preferred, although straight-bore nozzles are acceptable for shorter-length nozzles.

Molding parameters are also conventional, except that the nature of the high flow CIM compound useful in the present invention flows faster without sacrificing the physical properties of the final molded articles, such as impact toughness.

The following represent typical starting parameters for molding vinyl. On most equipment designed for engineering thermoplastics, the starting parameters will give a melt temperature close to the recommended temperature range of 390° F.-405° F. Clamp tonnage typically is 2 tons to 2.5 tons per square inch of projected area. Thinner walls or long flow lengths require higher clamp tonnage. Shot weight which uses 50%-80% of the barrel capacity is recommended, but a shot weight using 30%-90% of the barrel capacity may be possible. However, a long cycle time using a low shot weight percentage may lead to slight degradation of the material in the barrel.

Depending on press sizes ranging from 75 tons to 2500 tons, the temperatures of the rear, middle, and front zones can range from about 320° F. to about 370° F., respectively, with slightly higher temperatures in the middle and front zones compared with the rear zone. The nozzle temperature can range from 350° F. to 370° F., also depending on the press size from 75 tons to 2500 tons, with the lower temperature being associated with the lower temperature rear/middle/front zones.

The starting screw rotation also depends on press size. As press size increases, rotation can range from 50-75 rpm for a press size of 75-150 tons down to 10-15 rpm for a press size of 1100-2500 tons. Back pressure is not dependent on press size and generally can be 50-150 pounds/in$^2$. But both speed and back pressure are dependent on the screw compression ratio and screw configuration. Generally, the more severe the screw, the lower the screw speed and back-pressure settings.

Molding pressures fall into ranges for conventional CIM compounds: Injection Pressure of 800-1500 psi; Pack Pressure of 400-800 psi; and Hold Pressure of 300-600 psi.

The injection speed is dependent on the nozzle and sprue bushing diameters as well as the gate size and wall thickness. Initial settings in the 0.75 inch per second to 1.0 inch per second are reasonable.

The temperature of the inlet water can be in the range of 40° F.-150° F. For most applications, inlet water temperature in the range of 70° F.-90° F. is normal. Parts with wall thicknesses greater than 0.150 inches may use cooler water. Thin wall parts may require warmer water. The temperature of the water to the core side of the mold should be 5° F.-10° F. cooler than the cavity side. Part cooling time is dependent on melt temperature, cooling water temperature, wall thickness, and tool design.

Stainless steel is recommended for tools being built for rigid vinyl molding compounds, such as high flow CIM compound useful in this invention, to minimize tool damage if the compound somehow degrades during the molding process. Tool design for a mold cavity is necessarily unique to the intricate shape of the article to be made. However, generally, designing a mold for use with polyvinyl halide compounds follows standard mold-building practices. All sharp corners should be radiused. Full round runners are preferred. All types of gates can be used, as long as the gate size is proper for vinyl. Details of suggested sprues, runners, and gates for various average wall thicknesses and article weights appear in Technical Service Report No. 71 identified above.

Commercial injection molding equipment is well known in the art. Non-limiting examples of such equipment includes presses from such manufacturers as Wabash, Clifton, Dake, St. Lawrence, Hull, Watson Stillman, and Cincinnati Millacron.

Without undue experimentation, one skilled in the art, operating within the processing window and using custom-injection-molded poly(vinyl halide) compound of >80 grams/ 10 minutes melt flow can mold nearly any article to have finely textured surface(s).

One skilled in the art can also refer to such treatises as "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), in order to make injection-molded articles of any conceivable shape and appearance using the method of the present invention.

The art of injection molding even has a monthly magazine "Injection Molding" from Canon Communications LLC devoted to the technique. Details can be found at www.immnet.com, which also includes a book store webpage of relevant titles such as "Pocket Specs for Injection Molding, Sixth Edition", published by IDES.

As stated above, finely textured surfaces allow simulation by the thermoplastic article of the metal, glass, or wood article it is designed to replace. One should not be required to sacrifice appearance for durability.

Therefore, the topography to create the finely textured surface can be any appearance that occurs in human design or natural condition. The creation of the appearance can be created relying on functions ranging from Euclidean geometric designs to fractal geometric designs to semi-random designs to totally random designs.

Figure 2:
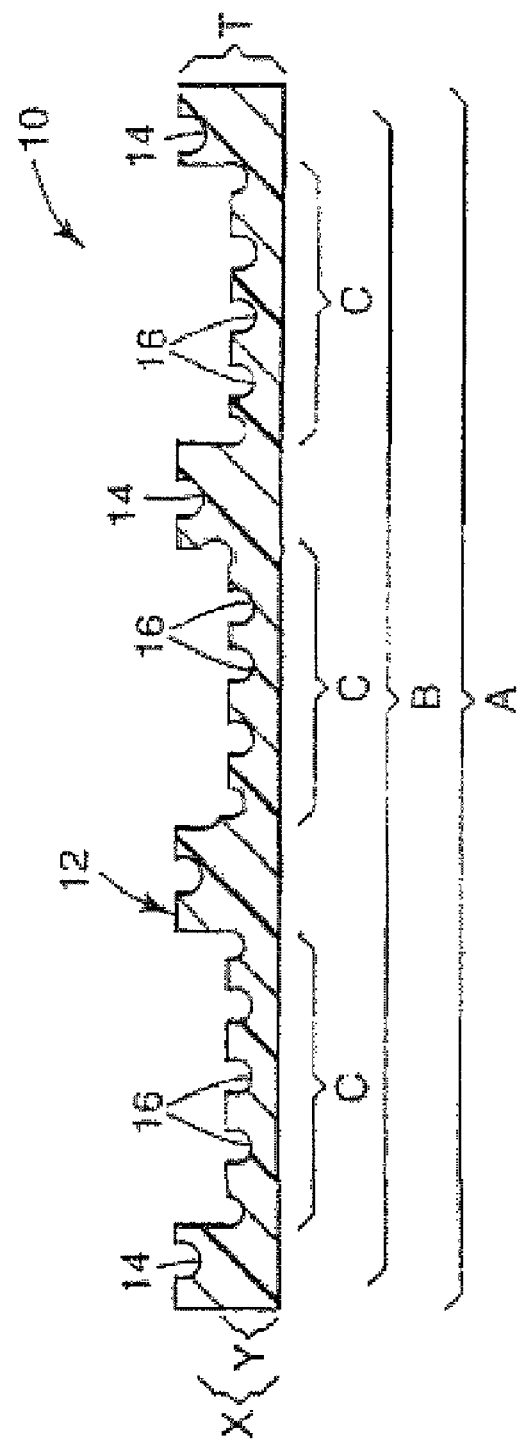
FIG. 2 is a cross-sectional view of another mold surface.

Referring to FIGS. 1 and 2, two types of mold surfaces, one can understand the design creativity possible using the method of the present invention. Nonetheless, FIGS. 1 and 2 are offered only as prototypical examples. Molds useful in making custom-injection-molded poly(vinyl halide) articles according to the present invention can be selected from a vast variety of complex topographies according to the needs of those skilled in the art.

FIG. 1 depicts a mold 10 having a surface 12 with one pattern 14 of recesses ready to receive molten custom-injection-molded poly(vinyl halide) compound. FIG. 2 depicts a second mold having a surface 12 with two different patterns 14 and 16 of recesses, into which molten custom-injection-molded poly(vinyl halide) compound can flow under the processing window of the method of the present invention.

Whereas FIG. 1 shows a simple mold surface 12, FIG. 2 has a complex superimposition of one pattern 14 into a second pattern 16, yielding a complex topography. For example, mold 10 has a thickness T where there is no recess, a thickness X caused by recesses of pattern 14, and a thickness Y caused by recesses of pattern 16.

The percentage of thickness X to thickness T can range from about 1% to about 99%, meaning that the depth of recesses caused in surface 12 by pattern 14 can range from a minor fraction of thickness T to almost the entire original thickness T.

The percentage of thickness Y to thickness T can range from about 1% to about 99%, meaning that the depth of recesses caused in surface 12 by pattern 16 can range from a minor fraction of thickness T to almost the entire original thickness T.

Further, mold 10 has a total area "A", a first area "B" having recesses of pattern 14 and an area "C" having recesses of pattern 16. FIG. 2 shows how recesses of pattern 14 cover the entire surface 12 of mold 10 and also reside in the larger recesses of pattern 16. Thus, total area A=area B, and all of area C resides within area B.

The percentage of B to A can range from about 1% to about 100%, meaning that surface 12 can have a pattern 14 ranging from a minor fraction of surface 12 to having the entire surface 12 with recesses of pattern 14.

The percentage of C to A can range from about 1% to about 100%, meaning that surface 12 have a pattern 16 ranging from a minor fraction of surface 12 to having the entire surface 12 of recesses of pattern 16.

The shape of recesses for either pattern 14, pattern 16, or both, can range from a constant radius of curvature to a polygonal shape of at least 2 surfaces within the recess in mold 10.

The width of recesses in pattern 14, pattern 16, or both can range from about 1 μm to about 10,000 μm.

It should be recognized that patterns 14 and 16 can be varied according to requirements in the art recognizing that the patterns are superimposed on one another. For example, the final molded article can have so-called "lands" (unmodified surface) and "projections" (plastic formed the recesses), where the lands are discontinuous or continuous. The result of pattern 14 creates separated lands from one another, and the result of pattern 16 creates separated projections from one another.

In other words, the topography of the mold 10 is an inverse image of the final topography of the custom-injection-molded poly(vinyl halide) molded article, with the mold transferring its image inversely but directly to the article.

So, an article molded from a mold 10 results in a surface on the molded article having an inverse or "mirror" image of the surface 12 of FIG. 1 or FIG. 2, wherein the recesses of patterns 14, 16, or both create protuberances or projections from the surface of the article. The addition of various depths on the surface of a molded article makes possible the simulation by the article of the original metal, glass, or wood article.

However, it should be apparent to those skilled in the art that the size of the mold 10 needed may exceed the size of projection desired because of thermoplastic properties of the custom-injection-molded poly(vinyl halide) article being molded In other words, one should accommodate mold shrinkage of the article upon cooling after molding.

The "sidewalls" of recesses for any of pattern 14, pattern 16, or any combination of them, which create projections or protuberances on the surface of the article can be any shape desired, ranging from a constant radius of curvature to any polygonal shape of at least 2 surfaces within the pattern 14 or 16. Nonlimiting examples of shapes of recesses/projections, in cross-section, include curved, rectangular, trapezoidal, triangular, bimodal, and the like.

The width of recesses in any of pattern 14, pattern 16, or any combination of them, can vary as needed. Whereas the appearance of prototypical molds 10 of FIGS. 1 and 2 show sheer Euclidean regularity, the design can also be Fractal, semi-random, or random in order to simulate the original metallic, glassy, or wooden article. For example, one skilled in the art could create a mold 10 with a surface that has patterns 14, 16 (and others) that simulates a wood-grain, in order that the molded article can be a replacement for a wooden article.

Precision of topographical formation of mold 10 can be achieved using a variety of machining techniques. The machine tool industry is capable of creating molds with any pattern desired by those skilled in the art.

Euclidean geometric patterns can be formed with any pattern of size, shape and depth of embossing projection in any number of steps.

Tools can range from planar presses to cylindrical drums to other curvilinear shapes, depending on how it is desired to employ the recessed surfaces. Non-limiting examples of sources of tooling include commercial sources of photolithographic printing plates and cylinders, precision engraved plates and cylinders, laser machined plates and cylinders, and the like.

Usefulness of the Invention

Any plastic article that is suitable for manufacture by injection molding is a candidate for the method of the invention. Using molds having intricate designs of recesses, one can create simulated plastic articles that are finely textured and capable of replacement of metal, glass, or wood articles that are susceptible to rusting, shattering, or rotting.

Non-limited examples of plastic articles include those used in the consumer industry, such as appliances, building and construction, business equipment, such as electrical equipment or telecommunications equipment. Within the building materials industry, panels such as shingles and other architectural ornamental details can be made because finely textured surfaces are now possible according to the present invention. The transportation industry can provide more aesthetically pleasing details, such as passenger compartment accoutrements made according to the present invention.

Particularly suitable for using this invention is the production of cedar shake shingles, a highly ornamental means of roofing and siding which is predicated on the rustic wood appearance of the cedar wood grain and dimensions of a shingle. The method of the present invention has successfully made finely textured custom-injection-molded poly(vinyl halide) molded cedar shake shingles which are aesthetically pleasing and functionally durable. Moreover, cedar trees would not be harvested to satisfy a particular architectural feature of the roofing or siding.

EXAMPLE

As a specific example of the invention, commercially available custom-injection-molded poly(vinyl chloride) compound (GEON® M7100) measured to have a melt flow index of at least 80 grams/10 minute according to ASTM D1238 with a load of 21.6 kg and at a temperature of 190° C. was selected to be injection molded into a test panel of 48 inches by 9.5 inches having a weight of 4.3 lbs using a 700 ton press and a shot size (stroke) of 7.8 inches. The test was successful, and an acceptable molded article was made.

The invention is not limited to the above embodiments. The claims follow.

What is claimed is:

1. A method of making a custom-injection-molded panel, comprising the steps of:
    (a) selecting a high flow custom-injection-molded polyvinyl halide compound having a minor amount of alkyl-aryl phosphite stabilizer, a Notched Izod Impact strength according to ASTM D256 at 23° C. and 0.32 cm thick test samples of at least about 640 J/m, and a melt flow index according to ASTM D1238 of at least about 80 grams/10 minutes;
    (b) injecting at a speed of from 0.75 inch per second to 1.0 inch per second the compound into a mold cavity for a panel having a temperature ranging from about 180 to about 220° C. and a hold pressure of 300-600 pounds per square inch, and
    (c) cooling the compound in the form of the compound-injection molded panel.

2. The method according to claim 1, wherein the compound-injection molded panel is a building construction material.

3. The method according to claim 2, wherein the building construction material simulates the appearance of a natural wood shingle.

4. The method according to claim 3, wherein the natural wood being simulated is cedar.

5. The method according to claim 1, wherein the custom-injection-molded panel is an appliance.

6. The method according to claim 1, wherein the custom-injection-molded panel is a piece of business equipment.

7. The method according to claim 1, wherein the custom-injection-molded panel is a piece of electrical equipment.

8. The method according to claim 1, wherein the custom-injection-molded panel is a piece of electronics equipment.

9. A custom-injection-molded panel made according to claim 1.

10. The panel of claim 9, wherein the panel essentially simulates a wood panel at a distance of about 1.5 meters or more.

11. The panel of claim 9, wherein the panel is a piece of building material, wherein the panel simulates the appearance of natural wood and has a finely textured surface.

12. The panel of claim 11, wherein the building material is an ornamental detail.

13. The panel of claim 11, wherein the building material is a shingle.

14. The panel of claim 9, wherein the panel has intricate shape.

15. The panel of claim 14, wherein the panel essentially simulates a wood panel at a distance of about 1.5 meters or more.

16. The panel of claim 9, wherein the panel is an appliance.

17. The panel of claim 9, wherein the panel is a piece of business equipment.

18. The panel of claim 9, wherein the panel is a piece of electrical equipment.

19. The panel of claim 9, wherein the panel is a piece of electronics equipment.

20. The panel of claim 9, wherein the minor amount of alkyl-aryl stabilizer is between 0.5 and 2.0 parts of ethylhexyl diphenyl phosphite.

* * * * *